United States Patent
Divakaran et al.

(10) Patent No.: US 6,697,523 B1
(45) Date of Patent: Feb. 24, 2004

(54) METHOD FOR SUMMARIZING A VIDEO USING MOTION AND COLOR DESCRIPTORS

(75) Inventors: Ajay Divakaran, Denville, NJ (US); Kadir A. Peker, Paterson, NJ (US); Huifang Sun, Cranbury, NJ (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 627 days.

(21) Appl. No.: 09/634,364

(22) Filed: Aug. 9, 2000

(51) Int. Cl.[7] .............................. G06K 9/34; G06K 9/62; G06K 9/54; G09G 5/00; G06F 3/00
(52) U.S. Cl. .................. 382/173; 382/224; 382/305; 345/723; 725/41
(58) Field of Search .................. 382/232, 173, 382/171, 224, 305; 348/700, 701, 702; 345/723; 725/37, 38, 39, 40, 41

(56) References Cited

U.S. PATENT DOCUMENTS

| | | | | |
|---|---|---|---|---|
| 5,835,163 A | * | 11/1998 | Liou et al. .................. 348/700 |
| 5,963,203 A | * | 10/1999 | Goldberg et al. ........... 345/723 |
| 6,404,925 B1 | * | 6/2002 | Foote et al. ................. 382/224 |
| 6,490,320 B1 | * | 12/2002 | Vetro et al. ............. 375/240.08 |
| 6,535,639 B1 | * | 3/2003 | Uchihachi et al. .......... 382/225 |
| 6,549,643 B1 | * | 4/2003 | Toklu et al. ................. 382/107 |
| 2001/0010523 A1 | * | 8/2001 | Sezan et al. ................. 345/716 |
| 2002/0018594 A1 | * | 2/2002 | Xu et al. ..................... 382/190 |
| 2003/0026340 A1 | * | 2/2003 | Divakaran et al. ..... 375/240.16 |

FOREIGN PATENT DOCUMENTS

EP     1089280 A2 *  4/2001  .......... G11B/27/28

OTHER PUBLICATIONS

"Generating optimal video summaries," Gong, Y et al., 2000 IEEE International Conference on Multimedia and Expo, vol. 3, 2000, pp. 1559–1562.*

"Efficient camera motion characterization for MPEG video indexing," Kim, J.G. et al., 2000 IEEE International Conference on Multimedia and Expo, vol. 2, 2000, pp. 1171–1174.*

* cited by examiner

*Primary Examiner*—Wenpeng Chen
(74) *Attorney, Agent, or Firm*—Dirk Brinkman

(57) ABSTRACT

A method extracts an intensity of motion activity from shots in a compressed video. The method then uses the intensity of motion activity to segment the video into easy and difficult segments to summarize. Easy to summarize segments are represented by any frames selected from the easy to summarize segments, while a color based summarization process extracts generates sequences of frames from each difficult to summarize segment. The selected and generated frames of each segment in each shot are combined to form the summary of the compressed video.

8 Claims, 4 Drawing Sheets

METHOD FOR SUMMARIZING A VIDEO USING MOTION AND COLOR DESCRIPTORS

FIELD OF THE INVENTION

This invention relates generally to videos, and more particularly to summarizing a compressed video.

BACKGROUND OF THE INVENTION

It is desired to automatically generate a summary of video, and more particularly, to generate the summary from a compressed digital video.

Compressed Video Formats

Basic standards for compressing a video as a digital signal have been adopted by the Motion Picture Expert Group (MPEG). The MPEG standards achieve high data compression rates by developing information for a full frame of the image only every so often. The full image frames, i.e. intra-coded frames, are often referred to as "I-frames" or "anchor frames," and contain full frame information independent of any other frames. Image difference frames, i.e., inter-coded frames, are often referred to as "B-frames" and "P-frames," or as "predictive frames," and are encoded between the I-frames and reflect only image differences i.e., residues, with respect to the reference frame.

Typically, each frame of a video sequence is partitioned into smaller blocks of picture element, i.e. pixel, data. Each block is subjected to a discrete cosine transformation (DCT) function to convert the statistically dependent spatial domain pixels into independent frequency domain DCT coefficients. Respective 8×8 or 16×16 blocks of pixels, referred to as "macro-blocks," are subjected to the DCT function to provide the coded signal.

The DCT coefficients are usually energy concentrated so that only a few of the coefficients in a macro-block contain the main part of the picture information. For example, if a macro-block contains an edge boundary of an object, then the energy in that block, after transformation, as represented by the DCT coefficients, includes a relatively large DC coefficient and randomly distributed AC coefficients throughout the matrix of coefficients.

A non-edge macro-block, on the other hand, is usually characterized by a similarly large DC coefficient and a few adjacent AC coefficients which are substantially larger than other coefficients associated with that block. The DCT coefficients are typically subjected to adaptive quantization, and then are run-length and variable-length encoded. Thus, the macro-blocks of transmitted data typically include fewer than an 8×8 matrix of codewords.

The macro-blocks of inter-coded frame data, i.e., encoded P or B frame data, include DCT coefficients which represent only the differences between a predicted pixels and the actual pixels in the macro-block. Macro-blocks of intra-coded and inter-coded frame data also include information such as the level of quantization employed, a macro-block address or location indicator, and a macro-block type. The latter information is often referred to as "header" or "overhead" information.

Each P-frame is predicted from the lastmost occurring I- or P-frame. Each B-frame is predicted from an I- or P-frame between which it is disposed. The predictive coding process involves generating displacement vectors, often referred to as "motion vectors," which indicate the magnitude of the displacement to the macro-block of an I-frame most closely matches the macro-block of the B- or P-frame currently being coded. The pixel data of the matched block in the I frame is subtracted, on a pixel-by-pixel basis, from the block of the P- or B-frame being encoded, to develop the residues. The transformed residues and the vectors form part of the encoded data for the P- and B-frames.

Video Analysis

Video analysis can be defined as processing a video with the intention of understanding the content of a video. The understanding of a video can range from a "low-level" syntactic understanding to a "high-level" semantic understanding.

The low-level understanding can be achieved by analyzing low-level features, such as color, motion, texture, shape, and the like. The low-level features can be used to partition the video into "shots." Herein, a shot is defined as a sequence of frames that begins when the camera is turned on and lasts until the camera is turned off. Typically, the sequence of frames in a shot captures a single "scene." The low-level features can be used to generate descriptions. The descriptors can then be used to index the video, e.g., an index of each shot in the video and perhaps its length.

A semantic understanding of the video is concerned with the genre of the content, and not its syntactic structure. For example, high-level features express whether a video is an action video, a music video, a "talking head" video, or the like.

Video Summarization

Video summarization can be defined as generating a compact representation of a video that still conveys the semantic essence of the video. The compact representation can include "key" frames or "key" segments, or a combination of key frames and segments. As an example, a video summary of a tennis match can include two frames, the first frame capturing both of the players, and the second frame capturing the winner with the trophy. A more detailed and longer summary could further include all frames that capture the match point. While it is certainly possible to generate such a summary manually, this is tedious and costly. Automatic summarization is therefore desired.

Automatic video summarization methods are well known, see S. Pfeifer et al. in "*Abstracting Digital Movies Automatically,*" J. Visual Comm. Image Representation, vol. 7, no. 4, pp. 345–353, December 1996, and Hanjalic et al. in "*An Integrated Scheme for Automated Video Abstraction Based on Unsupervised Cluster—Validity Analysis,*" IEEE Trans. On Circuits and Systems for Video Technology, Vol. 9, No. 8, December 1999.

Most known video summarization methods focus exclusively on color-based summarization. Only Pfeiffer et al. have used motion, in combination with other features, to generate video summaries. However, their approach merely uses a weighted combination that overlooks possible correlation between the combined features. Some summarization methods also use motion features to extract key frames.

As shown in FIG. 1, prior art video summarization methods have mostly emphasized clustering based on color features, because color features are easy to extract and robust to noise. A typical method takes a video A 101 as input, and applies a color based summarization process 100 to produce a video summary S(A) 102. The video summary consists of either a single summary of the entire video, or a set of interesting frames.

The method 100 typically includes the following steps. First, cluster the frames of the video according to color features. Second, arrange the clusters in an easy to access hierarchical data structure. Third, extract a key frame or a key sequence of frames from each of the cluster to generate the summary.

Motion Activity Descriptor

A video can also be intuitively perceived as having various levels of activity or intensity of action. Examples of a relatively high level of activity is a scoring opportunity in a sporting event video, on the other hand, a news reader video has a relatively low level of activity. The recently proposed MPEG-7 video standard provides for a descriptor related to the motion activity in a video.

SUMMARY OF THE INVENTION

It is an objective of the present invention to provide an automatic video summarization method using motion features, specifically motion activity features by themselves and in conjunction with other low-level features such as color and texture features.

The main intuition behind the present invention is based on the following hypotheses. The motion activity of a video is a good indication of the relative difficulty of summarization the video. The greater the amount of motion, the more difficult it is to summarize the video. A video summary can be quantitatively described by the number of frames it contains, for example, the number of key frames, or the number of frames of key segments.

The relative intensity of motion activity of a video is strongly correlated to changes in color characteristics. In other words, if the intensity of motion activity is high, there is a high likelihood that change in color characteristics is also high. If the change in color characteristics is high, then a color feature based summary will include a relatively large number of frames, and if the change in color characteristics is low, then the summary will contain fewer frames.

For example, a "talking head" video typically has a low level of motion activity and very little change in color as well. If the summarization is based on key frames, then one key frame would suffice to summarize the video. If key segments are used, then a one-second sequence of frames would suffice to visually summarize the video. On the other hand, a scoring opportunity in a sporting event would have very high intensity of motion activity and color change, and would thus take several key frames or several seconds to summarize.

More particularly, the invention provides a method that summarizes a video by first extracting intensity of motion activity from a video. It then uses the intensity of motion activity to segment the video into easy and difficult segments to summarize.

Easy to summarize segments are represented by a single frame, or selected frames anywhere in the segment, any frame will do because there is very little difference between the frames in the easy to summarize segment. A color based summarization process is used to summarize the hard segments. This process extracts sequences of frames from each difficult to summarize segment. The single frames and extracted sequences of frames are combined to form the summary of the video.

The combination can use temporal, spatial, or semantic ordering. In a temporal arrangement, the frames are concatenated in some temporal order, for example first-to-last, or last-to-first. In a spatial arrangement, miniatures of the frames are combined into a mosaic or some array, for example, rectangular so that a single frame shows several miniatures of the selected frames of the summary. A semantically ordered summary might go from most exciting to least exciting.

DETAILED DESCRIPTION OF PREFERRED EMBODIMENTS

Figure 1:
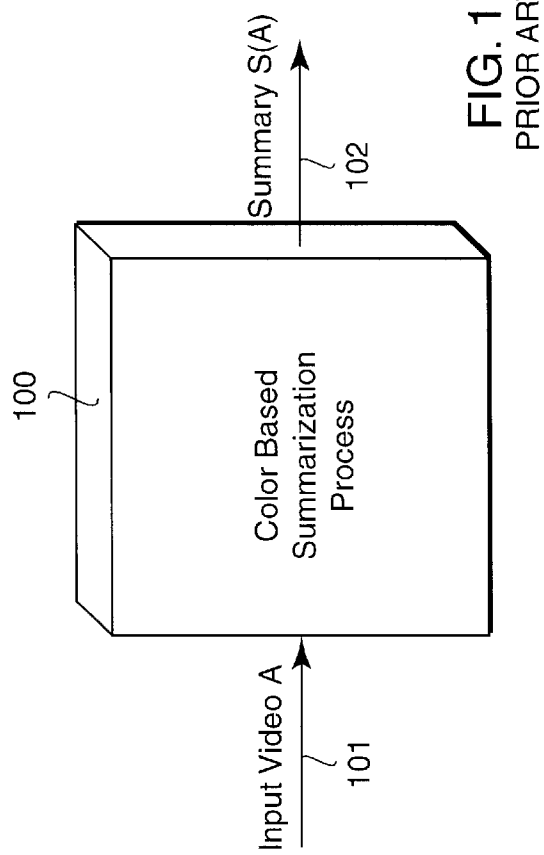
FIG. 1 is a block diagram of a prior art video summarization method.

Our invention summarizes a compressed video using color and motion features. Therefore, our summarization method first extracts features from the compressed video.

Feature Extraction

Color Features

We can accurately and easily extract DC coefficients of an I-frame using known techniques. For P-and B-frames, the DC coefficients can be approximated using motion vectors without full decompression, see, for example, Yeo et al. "*On the Extraction of DC Sequence from MPEG video,*" IEEE ICIP Vol. 2, 1995. The YUV value of the DC image can be transformed to a different color space to extract the color features.

The most popular used technique uses a color histogram. Color histograms have been widely used in image and video indexing and retrieval, see Smith et al. in "*Automated Image Retrieval Using Color and Texture,*" IEEE Transaction on Pattern Analysis and Machine Intelligence, November 1996, Typically, in a three channel RGB color space, with four bins for each channel, a total of 64 (4×4×4) bins are needed for the color histogram.

Motion Features

Motion information is mostly embedded in motion vectors. Motion vectors can be extracted from P- and B-frames. Because motion vectors are usually a crude and sparse approximation to real optical flow, we only use motion vectors qualitatively. Many different methods to use motion vectors are known, see Tan et al. "*A new method for camera motion parameter estimation,*" Proc. IEEE International Conference on Image Processing, Vol. 2, pp. 722–726, 1995, Tan et al. "*Rapid estimation of camera motion from compressed video with application to video annotation,*" to appear in IEEE Trans. on Circuits and Systems for Video Technology, 1999. Kobla et al. "*Detection of slow-motion replay sequences for identifying sports videos,*" Proc. IEEE Workshop on Multimedia Signal Processing, 1999, Kobla et al. "*Special effect edit detection using VideoTrails: a comparison with existing techniques,*" Proc. SPIE Conference on Storage and Retrieval for Image and Video Databases VII, 1999, Kobla et al., "*Compressed domain video indexing techniques using DCT and motion vector information in MPEG video,*" Proc. SPIE Conference on Storage and Retrieval for Image and Video Databases V, SPIE Vol. 3022, pp. 200–211, 1997, and Meng et al. "*CVEPS—a compressed video editing and parsing system,*" Proc. ACM Multimedia 96, 1996.

As stated above, most prior art summarization methods are based on clustering color features to obtain color descriptors. While color descriptors are relatively robust to noise, by definition, they do not include the motion characteristics of the video. However, motion descriptors tend to be less robust to noise, and therefore, they have not been as widely used for summarizing videos.

U.S. patent application Ser. No. 09/406,444 (now abandoned) "Activity Descriptor for Video Sequences,"

filed by Divakaran et al. describes how motion features derived from motion vectors in a compressed video can be used to determine motion activity and the spatial distribution of the motion activity in the video. Such descriptors are successful for video browsing applications. Now, we apply such motion descriptors to video summarization.

We hypothesize that the relative level of activity in a video can be used to measure the "summarizability" of the video. Unfortunately, there are no simple objective measures to test this hypothesis. However, because changes in motion often are accompanied by changes in the color characteristics, we investigate the relationship between the relative intensity of motion activity and changes in color characteristics of a video.

Motion and Color Changes

We do this by extracting the color and motion features of videos from the MPEG-7"test-set." We extract the motion activity features from all the P-frames by computing the average of motion vector magnitudes, and a 64-bin RGB histogram from all the I-frames. We then compute the change in the histogram from I-frame to I-frame. We apply a median filter to the vector of frame-to-frame color histogram changes to eliminate changes that correspond to segment cuts or other segment transitions. We plot the intensity of motion activity versus the median filtered color change for every frame as shown in FIGS. 2 and 3.

Figure 2:
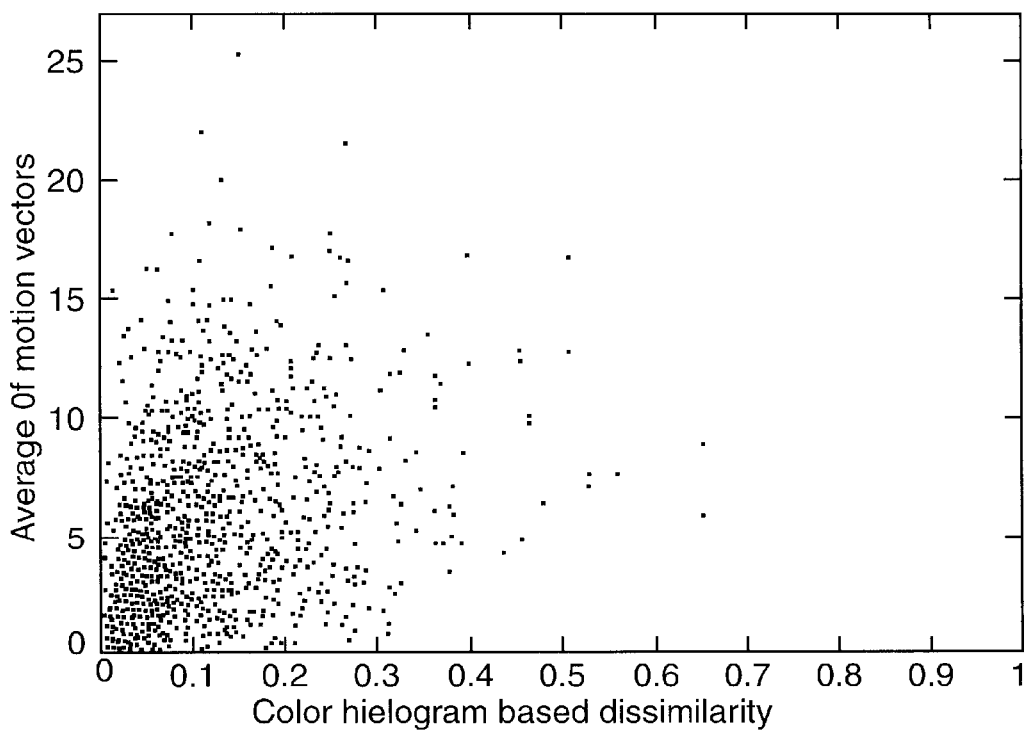
FIGS. 2 and 3 are graphs plotting motion activity versus color changes for MPEG test videos.
Figure 3:
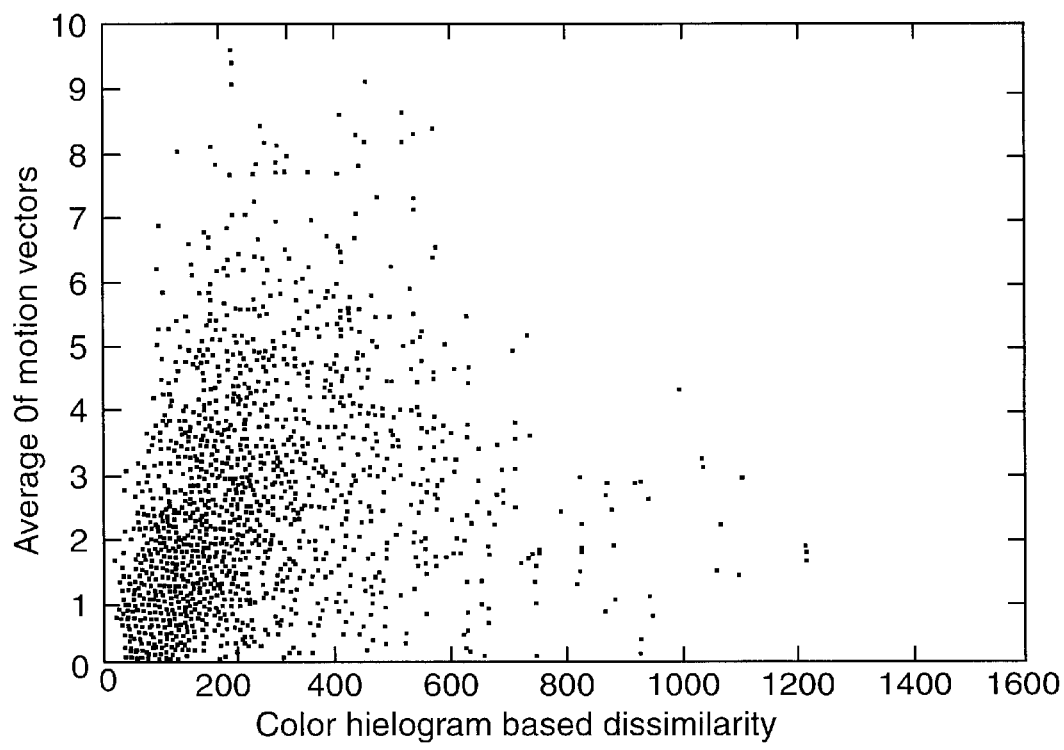

FIGS. 2 and 3 respectively show the relationship between intensity of motion activity and color dissimilarity for "jornaldanoite1" and "news1" test sets. There is a clear correlation between the intensity of motion activity and the change in color. For low activity, it is very clear that the change in color is also low. For higher activity levels, the correlation becomes less evident as there are many possible sources of high activity, some of which may not result in color content change. However, when the activity is very low, it is more likely that the content does not change frame-to-frame. We use this information to pre-filtering a video to detect segments which are almost static, and hence, these static segments be summarized by a single key frame. Based in these results we provide the following summarization method.

Summarization Method

Figure 4:
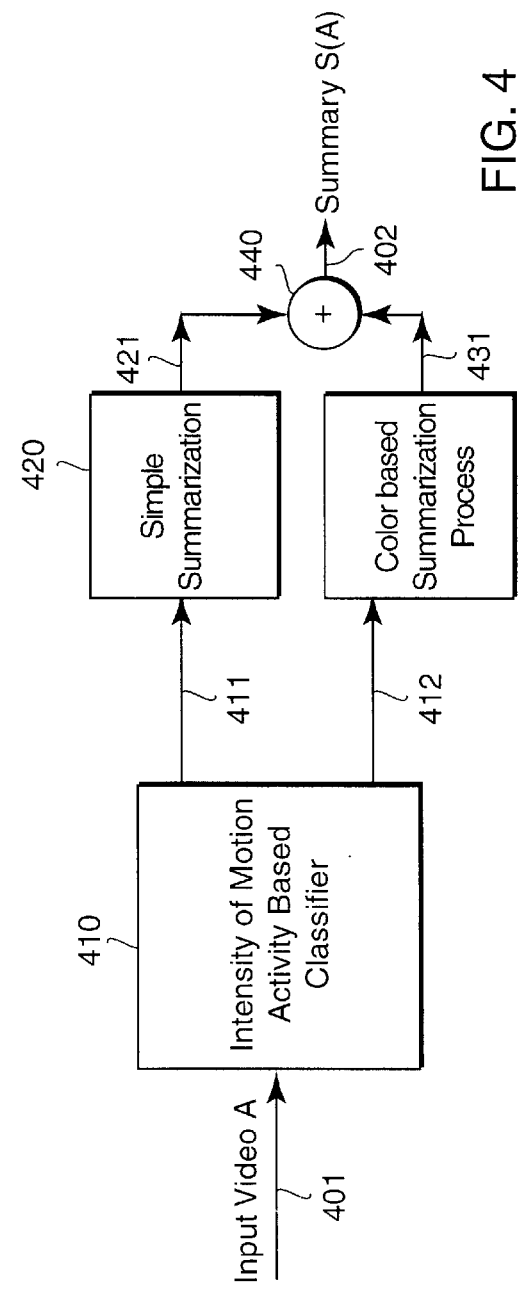
FIG. 4 is a flow diagram of a video summarization method according the proposed system.

FIG. 4 shows a method 400 for summarizing an input compressed video A 401 to produce a summary S(A) 402.

The input compressed video 401 is partitioned into "shots" using standard techniques well known in the art, and as described above. By first partitioning the video into shots, we ensure that each shot is homogenous and does not include a scene change. Thus, we will properly summarize a video of, for example, ten consecutive different "talking head" shots that at a semantic level would other wise appear identical. From this point on the video is processed on a shot-by-shot manner.

Step 410 determines the relative intensity of motion activity for each frame of each shot. Each frame is classified into either a first or second class. The first class includes frames that are relatively easy to summarize, and the second class 412 includes frames that are relatively difficult to summarize. In other words, our classification is motion based.

Consecutive frames of each shot that have the same classification are grouped into either an "easy" to summarize segment 411, and a "difficult" to summarize segment 412.

For easy segments 411 of each shot, we perform a simple summarization 420 of the segment by selecting a key frame or a key sequence of frames 421 from the segment. The selected key frame or frames 421 can be any frame in the segment because all frames in an easy segment are considered to be semantically alike.

For difficult segments 412 of each shot, we apply a color based summarization process 500 to summarize the segment as a key sequence of frames 431.

The key frames 421 and 431 of each shot are combined in form the summary of each shot, and the shot summarizes can be combined to form the final summary S(A) 402 of the video.

The combination of the frames can use temporal, spatial, or semantic ordering. In a temporal arrangement, the frames are concatenated in some temporal order, for example first-to-last, or last-to-first. In a spatial arrangement, miniatures of the frames are combined into a mosaic or some array, for example, rectangular so that a single frame shows several miniatures of the selected frames of the summary. A semantic ordering could be mots-to-least exciting, or quite-to-loud.

Figure 5:
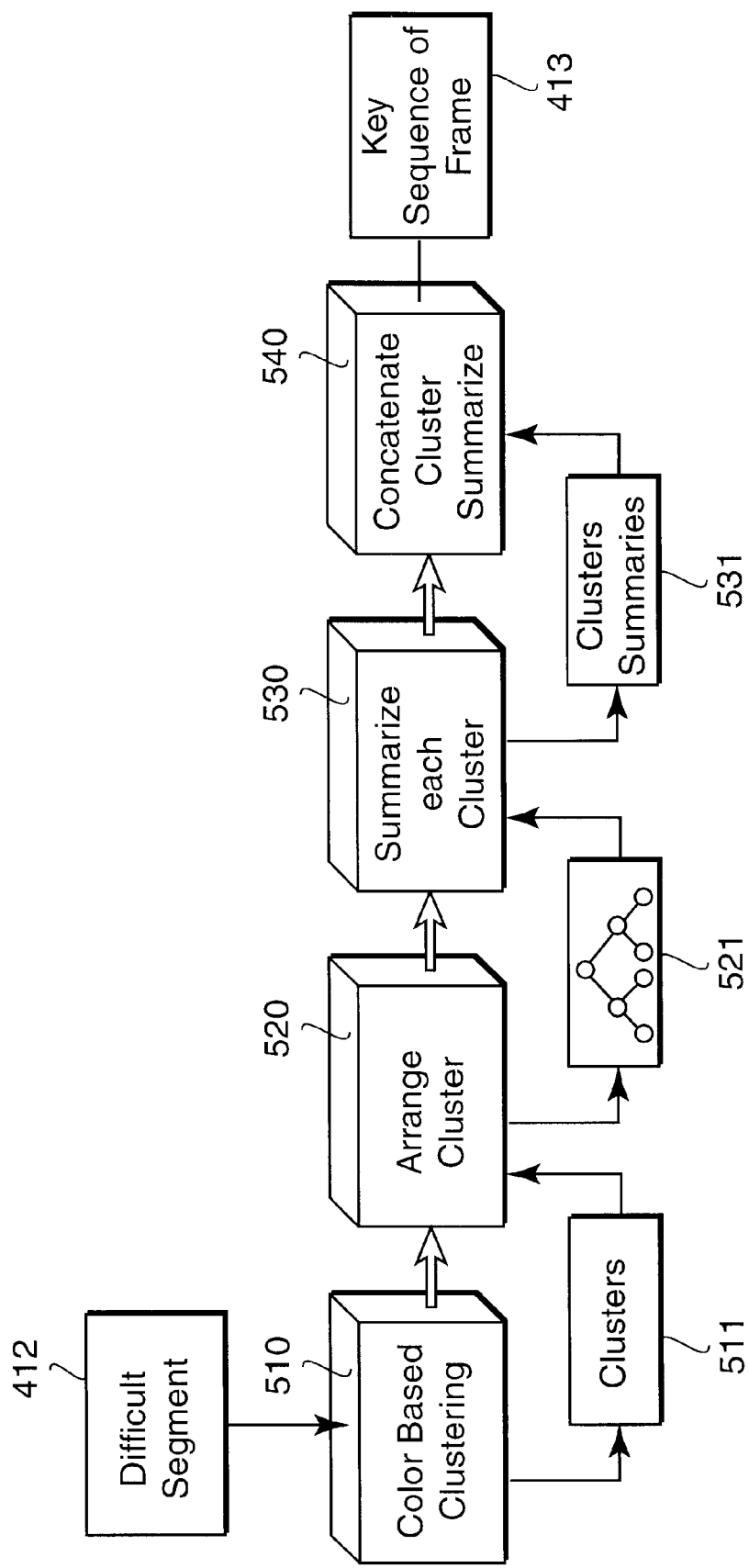
FIG. 5 is a flow diagram of a color based summarization process according to the invention.

FIG. 5 shows the steps of a preferred color based summarization process 500. Step 510 clusters the frames of each difficult segment 412 according to color features into clusters. Step 520 arranges the clusters as a hierarchical data structure 521. Step 530 summarizes each cluster 511 of the difficult segment 412 by either extracting a sequence of frames from the cluster to generate cluster summaries 531. Step 440 combines the cluster summaries to form the key sequence of frames 431 that summarize the difficult segment 412.

This method is especially effective with news-video type sequences because the content of the video primarily comprises low-action frames of "talking-heads" that can be summarized by key frames. The color-based clustering process 500 needs to be carried out only on for sequences of frames that have higher levels of action, and thus the overall computational burden is reduced.

Figure 6:
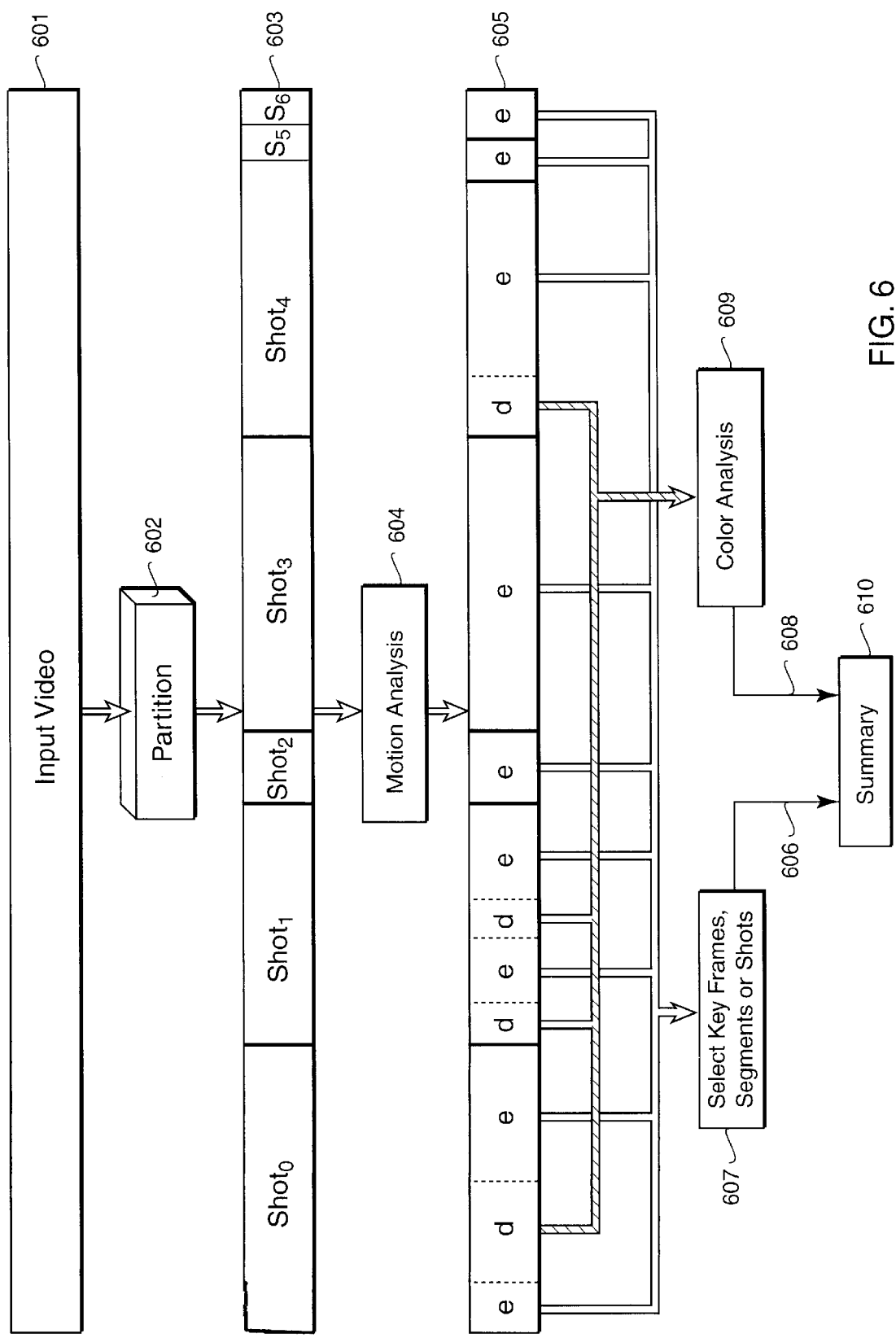
FIG. 6 is a block diagram of the video summarization method according to the invention.

FIG. 6 shows the summarization method 400 graphically. An input video 601 is partitioned 602 into shots 603. Motion activity analysis 604 is applied to the frames of the shots to determine easy (e) and difficult (d) segments 605. Key frames, segments, or shots 606 extracted 607 from easy segments are combined with color based summaries 608 derived from clustered color analysis 609 to form the final summary 610.

In one application, the summary is produced dynamically from the compressed video so that the summary of the entire video is available to the viewer within minutes of starting to "play" the video. Thus, the viewer can use the dynamically produced summary to "browse" the video.

Furthermore, based on the dynamically produced summary, the user can request for certain portions to be resummarized on-the-fly. In other words, as the video is played, the user summarizes selected portions of the video to various levels of detail, using the summaries themselves for the selection process, perhaps, using different summarization techniques for the different portions. Thus, our invention provides a highly interactive viewing modality that hitherto now has not been possible with prior art static summarization techniques.

Although the invention has been described by way of examples of preferred embodiments, it is to be understood that various other adaptations and modifications may be made within the spirit and scope of the invention. Therefore, it is the object of the appended claims to cover all such variations and modifications as come within the true spirit and scope of the invention.

We claim:

1. A method for summarizing a compressed video including motion and color features, comprising:

partitioning the compressed video into a plurality of shots;

classifying each frame of each shot according to the motion features, a first class frame having relatively low motion activity and a second class frame having relatively high motion activity;

grouping consecutive frames having the same classification into segments;

selecting any one or more frames from each segment having the first classification;

generating a sequence of frames from each segment having the second classification using the color features; and combining the selected and generated frames of each segment of each shot to form a summary of the compressed video.

2. The method of claim 1 further comprising:

combining the selected and generated frames in a temporal order.

3. The method of claim 1 further comprising:

combining the selected and generated frames in a spatial order.

4. The method of claim 3 further comprising:

reducing the selected and generated frames in size to form miniature frames.

5. The method of claim 1 further comprising:

combining the selected and generated frames in a semantic order.

6. The method of claim 1 further comprising:

grouping the frames of each segment having the second classification into clusters according to the color features;

generating a cluster summary for each cluster; and combining the cluster summaries to form the generated sequences of frames.

7. The method of claim 1 wherein the summary is produced while playing the video.

8. The method of claim 1 wherein the summary is used to resummarize the video.

* * * * *